Sept. 16, 1952        R. E. KENNEDY        2,611,067
ELECTRICAL COOKING DEVICE
Filed Sept. 10, 1951        2 SHEETS—SHEET 1
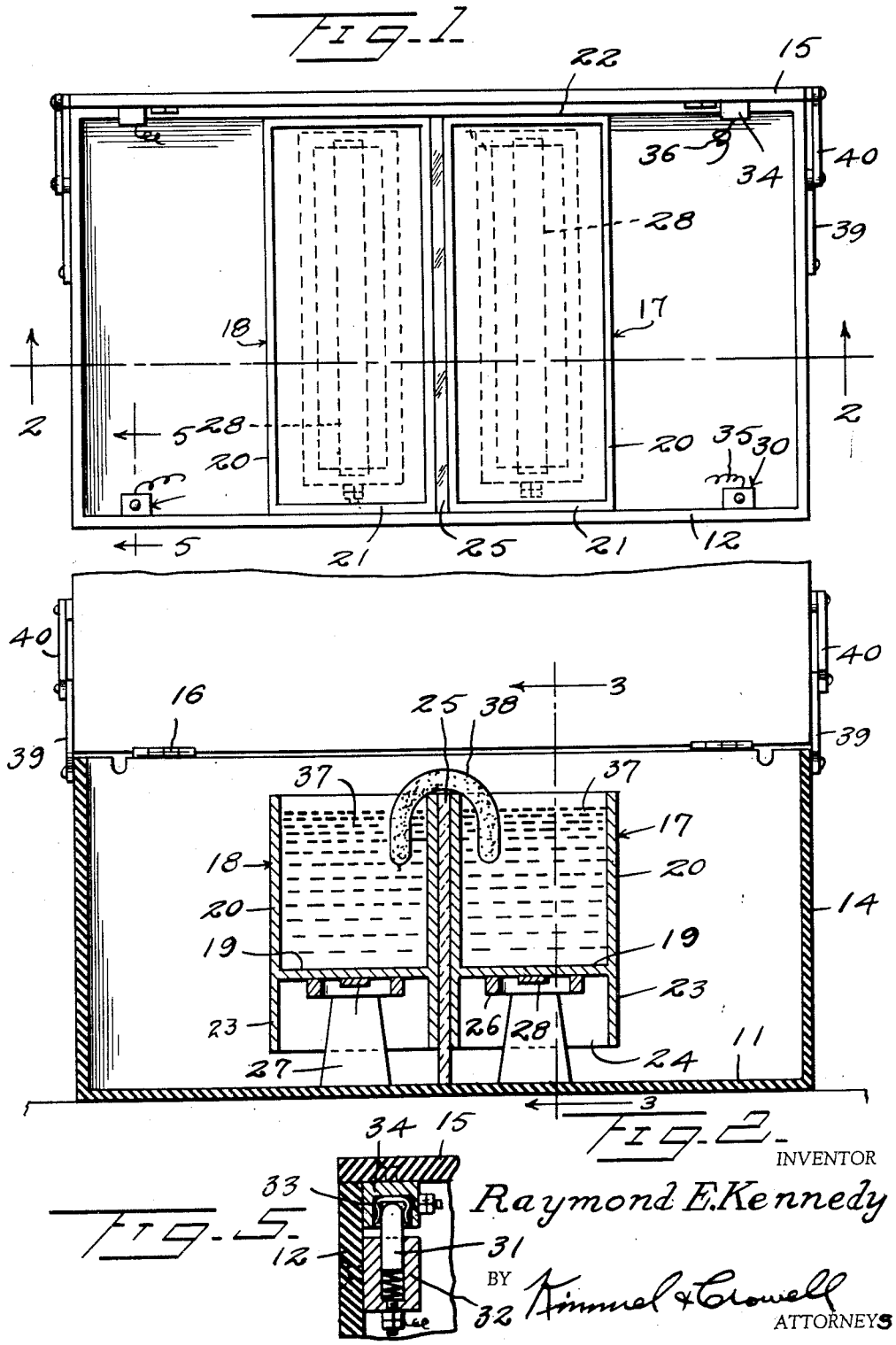
INVENTOR
Raymond E. Kennedy
BY Kimmel & Crowell
ATTORNEYS Sept. 16, 1952 R. E. KENNEDY 2,611,067
ELECTRICAL COOKING DEVICE
Filed Sept. 10, 1951 2 SHEETS—SHEET 2
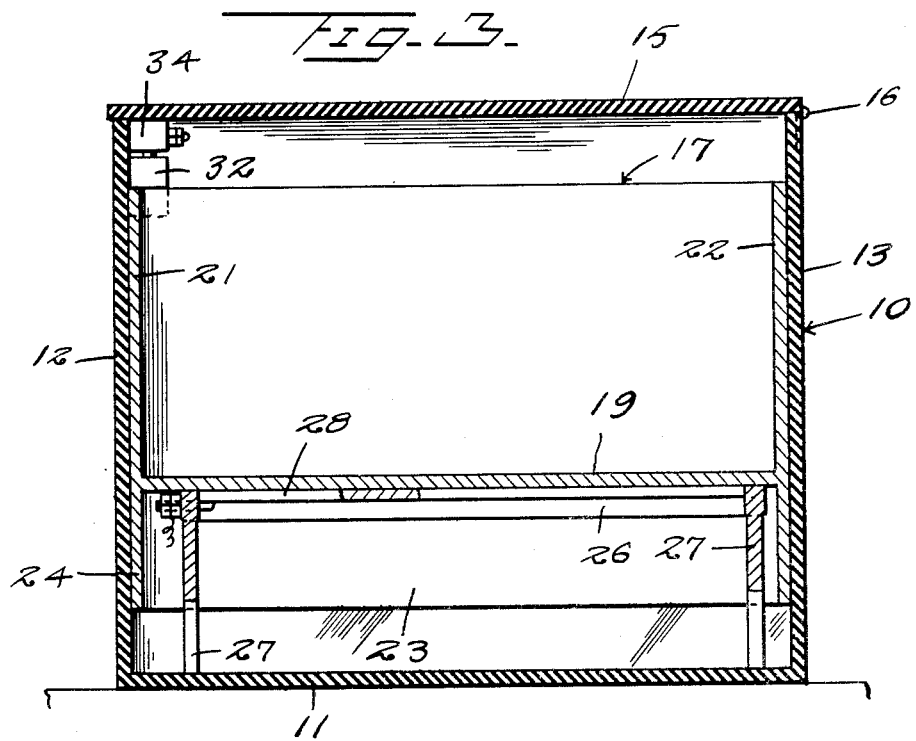
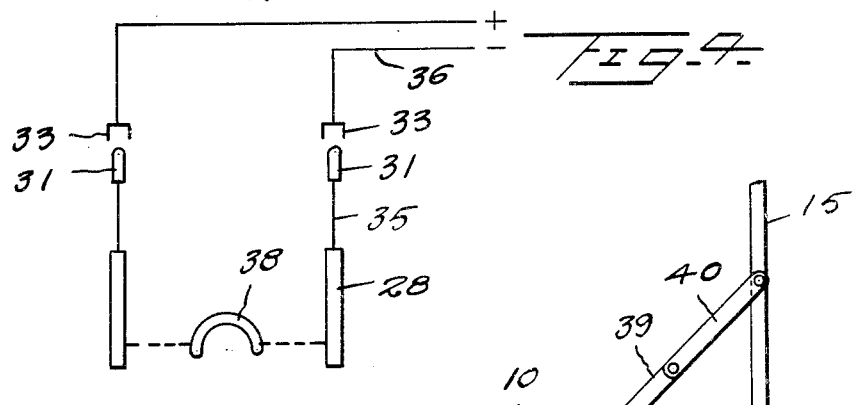
INVENTOR
Raymond E. Kennedy
BY Kimmel & Crowell
ATTORNEYS Patented Sept. 16, 1952

2,611,067

UNITED STATES PATENT OFFICE 2,611,067

ELECTRICAL COOKING DEVICE

Raymond E. Kennedy, New Salisbury, Ind.

Application September 10, 1951, Serial No. 245,949

2 Claims. (Cl. 219—19)

This invention relates to an electrical cooking device.

An object of this invention is to provide an electrical cooker which is designed for cooking of frankfurters or wieners wherein the food article forms the electrical connection between spaced electrodes.

Another object of this invention is to provide a pair of spaced receptacles adapted to hold a liquid, such as water or the like, with means for connecting the receptacles to a source of electric current supply which is so constructed and arranged that the electric circuit is broken when the receptacles are exposed.

A further object of this invention is to provide a housing having a hinged lid with a pair of receptacles in the housing and means for connecting the receptacles to a source of electric current supply which includes a pair of switches carried by the housing and lid so that the electric circuit will be broken when the lid is opened and will be closed when the lid is closed, thereby providing a safety factor which will prevent accidental shock to a person using the cooker.

With the above and other objects in view, my invention consists in the arrangement, combination and details of construction disclosed in the drawings and specification, and then more particularly pointed out in the appended claims.

In the drawings—

Figure 1 is a plan view of an electrical cooker for frankfurters or wieners, constructed according to an embodiment of this invention, showing the device in open position, Figure 2 is a sectional view taken on the line 2—2 of Figure 1, Figure 3 is a sectional view taken on the line 33 of Figure 1, showing the lid cover in closed position, Figure 4 is a diagrammatic view showing the electric circuit embodied in this invention, Figure 5 is a framentary sectional view taken on the line 5—5 of Figure 1, showing the contacts or switches in closed position, Figure 6 is a fragmentary end elevation of the device with the lid in open position.

Referring to the drawings, the numeral 10 designates generally a housing formed of a bottom wall 11, front and rear walls 12 and 13, and opposite end walls 14. A lid or cover 15 is hingedly secured as at 16 to the upper edge of the rear wall 13.

A pair of liquid holding receptacles 17 and 18 are disposed within the housing 10, extending between the front and rear walls, as shown in Figure 1. The two receptacles 17 and 18 are of like construction and each includes a bottom wall 19, opposite side walls 20, and front and rear walls 21 and 22. Each receptacle is also formed with depending guards 23 projecting from the side walls 20 and also is formed with opposite end guards 24.

An insulating plate 25 is disposed between the confronting sides of the two receptacles 17 and 18 and is fixed between the front and rear walls 12 and 13 respectively of the housing 10. Each receptacle is supported above the bottom wall 11 by means of a horizontally disposed rectangular frame member 26 which is supported above the bottom wall 11 by means of upstanding legs 27. An electrode 28 is disposed within the frame 26 in a position to engage the bottom wall 19, and a terminal 29 extends from one end of the electrode 28.

A switch generally designated as 30 is associated with each electrode 28 and each switch 30 includes a male contact member 31 carried by an insulated body 32 which is fixed to the inner side of the front wall 12. A female contact member 33 is carried by an insulated body 34 which is fixed to the inner side of the lid 15, and contact 33 is adapted to engage contact 31 when the lid 15 is in closed position. Contact 31 is connected to electrode 28 by means of a conductor 35, and contact 33 has one end of a conductor 36 connected thereto. The conductor 36 is adapted to be connected at the opposite end to one side of a source of electric current supply.

Each receptacle 17 and 18 is adapted to have a liquid 37, such as water or the like, disposed therein, and a frankfurter 38 is adapted to be bent over the inner side of the receptacles 17 and 18 and over the insulating plate 25, with the opposite ends of the article extending into the liquid 37. In this manner the frankfurter 38 forms the connecting link between the electrodes 28 through the water 37. The lid 15 is adapted to be held in open position by means of a pair of pivotally connected together links 39 and 40.

In the use and operation of this device, the frankfurters or wieners are bent over the inner sides of the container or receptacles 17 and 18 and extended into the water or liquid 37 within each receptacle. The conductors 36 are connected to a source of electric current supply and when the lid 15 is closed switches 30 will be closed so that a complete circuit will be formed between the two electrodes 28 and the resistance of the liquid 37 will act to provide for the heating of the liquids in the two containers, which liquids are connected together by the bent frankfurters 38.

It will be understood that as used herein the terms cooking and cooker include also merely heating.

I do not mean to confine myself to the exact details of construction herein disclosed, but claim all variations falling within the purview of the appended claims.

What I claim is:

1. An electrical cooker comprising a housing formed of electrical insulating material, a lid hinged to said housing, an insulating partition disposed between a pair of walls of said housing, a pair of electrodes disposed one on each side of said partition, a pair of liquid holding receptacles one on each side of said partition, means comprising a horizontally disposed rectangular frame, legs supporting said frame, and means securing said electrodes in electrical association with the bottom of said frame for supporting said electrodes out of contact with the bottom of said housing, a pair of switch elements carried by said housing, means connecting said elements with said electrodes, a pair of complementary switch elements carried by said lid adapted to engage said first pair of switch elements when said lid is closed, and means connecting said second pair of switch elements with a source of electric current supply.

2. An electrical cooker comprising a housing formed of electrical insulating material, a lid hinged to said housing, an insulating partition disposed between a pair of walls of said housing, a pair of electrodes disposed one on each side of said partition, means supporting said electrodes above the bottom of said housing, a pair of liquid holding receptacles one on each side of said partition and contacting with said electrodes, depending guards carried by said receptacles about the sides and the ends thereof and engaging about said electrodes, a pair of switch elements carried by said housing, means connecting said elements with said electrodes, a pair of complementary switch elements carried by said lid adapted to engage said first pair of switch elements when said lid is closed, and means connecting said second pair of switch elements with a source of electric current supply.

RAYMOND E. KENNEDY.

REFERENCES CITED

The following references are of record in the file of this patent:

UNITED STATES PATENTS

| Number | Name | Date |
|---|---|---|
| 2,405,984 | Sharpe | Aug. 20, 1946 |
| 2,463,613 | Hagen | Mar. 8, 1949 |

FOREIGN PATENTS

| Number | Country | Date |
|---|---|---|
| 757,656 | France | Oct. 16, 1933 |